US012576567B2

(12) United States Patent
Guha et al.

(10) Patent No.: US 12,576,567 B2
(45) Date of Patent: Mar. 17, 2026

(54) FIBER PREFORM WITH MISTAKE-PROOF POSITIONING ELEMENT AND USE THEREOF

(71) Applicant: J. & P. COATS LIMITED, Uxbridge (GB)

(72) Inventors: Probir Kumar Guha, Uxbridge (GB); George Han, Uxbridge (GB)

(73) Assignee: J. & P. Coats Limited, Uxbridge (GB)

( * ) Notice: Subject to any disclaimer, the term of this patent is extended or adjusted under 35 U.S.C. 154(b) by 359 days.

(21) Appl. No.: 17/830,474

(22) Filed: Jun. 2, 2022

(65) Prior Publication Data

US 2022/0388210 A1     Dec. 8, 2022

Related U.S. Application Data

(60) Provisional application No. 63/195,870, filed on Jun. 2, 2021.

(51) Int. Cl.
B29C 45/14          (2006.01)
B32B 5/02          (2006.01)

(52) U.S. Cl.
CPC .. B29C 45/14065 (2013.01); B29C 45/14008 (2013.01); B32B 5/02 (2013.01); B29C 2045/14131 (2013.01)

(58) Field of Classification Search
CPC ................... B29C 45/14065; B29C 45/14008
USPC ......................................................... 428/134
See application file for complete search history.

(56) References Cited

FOREIGN PATENT DOCUMENTS

| WO | WO-2019008444 A1 * | 1/2019 | ............. | B29C 70/08 |
| WO | WO-2020102363 A2 * | 5/2020 | ........... | B29C 70/021 |

* cited by examiner

*Primary Examiner* — Tahseen Khan
(74) *Attorney, Agent, or Firm* — MaxGoLaw PLLC

(57)          ABSTRACT

A fiber preform is provided for use in an overmolding process that includes a fiber bundle arranged in a predetermined pattern and attached to itself by a plurality of stitches of a thread to form at least one preform layer. At least one positioning element is associated with the at least one preform layer, the at least one positioning element configured to engage with at least one corresponding alignment element on a mold to indicate proper positioning of the fiber preform within the mold. A process of overmolding is also provided in which the at least one positioning element of the fiber preform engages with the at least one corresponding alignment element on the mold to indicate proper positioning. The mold cavity is then filled with a resin to permeate the fiber preform engaging the mold in a unique orientation to yield an article upon resin cure.

20 Claims, 19 Drawing Sheets

17

FIBER PREFORM WITH MISTAKE-PROOF POSITIONING ELEMENT AND USE THEREOF

RELATED APPLICATIONS

This application claims priority benefit of U.S. Provisional Application Ser. No. 63/195,870 filed Jun. 2, 2021; the contents of which are hereby incorporated by reference.

TECHNICAL FIELD

The present invention generally relates to a fiber preform for use in a resin transfer molding or liquid composite molding process, and more particularly to a fiber preform having a positioning element for properly aligning the fiber preform with a mold designed to impart a three-dimensional shape to the preform.

BACKGROUND

Tailored Fiber Placement (TFP) is a textile manufacturing technique in which fibrous material is arranged on another piece of base material and is fixed with an upper and lower stitching thread on the base material. The fiber material can be placed in curvilinear patterns of a multitude of shapes upon the base material. Layers of the fiber material may be built up to produce a two-dimensional fiber preform insert, which may be used as an insert overmolding, resin transfer molding, or liquid composite molding process to create composite materials.

Resin transfer molding or overmolding (hereafter referred to synonymously as "RTM") and liquid composite molding ("LCM") are processes in which the fiber preform in placed in a mold and thermoset curable matrix material is overmolded. These materials include epoxy, vinylester, polyester, and urethanes. The major overmolding processes includes insert molding and two-shot molding. Materials are usually chosen specifically to bond together, using the heat from the injection of the second material to form that bond that avoids the use of adhesives or assembly of the completed part, and results in a robust composite material part with a high-quality finish.

Composite materials are increasingly used in industry because of their high strength to weight ratios. Unfortunately, mistakes are easily made when positioning a fiber preform in a mold. That is, the fiber preform may mistakenly be placed in the mold in a rotated position, in an inverted position, in a bunched up position, or similar incorrect position, which then results in the resulting composite part being unusable and wasted, leading to increased production cost, increased scrappage, and diminished throughput. Furthermore, when a composite material mold includes three-dimensional geometry such as a corner or corrugations, it is difficult to ensure proper placement and fit of the preform material in the mold, which results in compromised resin flow and properties at points of inflection. Layers of preform material can be laid up by hand to attempt to properly fit the preform into a mold having corners or inflection points, however, this process is slow and prone to operator error. Accordingly, using fiber preform inserts for parts having any point of inflection or corner is unfavorable in terms of production cost, increased scrappage, and diminished throughput.

Thus, there exists a need for a novel fiber preform having a positioning element for properly aligning the fiber preform with a mold, particularly a mold designed to impart a three-dimensional shape to the preform and resulting composite material component.

SUMMARY OF THE INVENTION

A fiber preform is provided for use in an overmolding process that includes a fiber bundle arranged in a predetermined pattern and attached to itself by a plurality of stitches of a thread to form at least one preform layer. At least one positioning element is associated with the at least one preform layer, the at least one positioning element configured to engage with at least one corresponding alignment element on a mold to indicate proper positioning of the fiber preform within the mold.

A process of overmolding is also provided in which the at least one positioning element of the fiber preform engages with the at least one corresponding alignment element on the mold to indicate proper positioning of the fiber preform within the mold. The mold cavity is then filled with a resin to permeate the fiber preform engaging the mold in a unique orientation to yield an article upon resin cure.

BRIEF DESCRIPTION OF THE DRAWINGS

The present invention is further detailed with respect to the following drawings that are intended to show certain aspects of the present of invention, but should not be construed as limit on the practice of the invention, wherein.

DETAILED DESCRIPTION OF THE INVENTION

Figure 1:
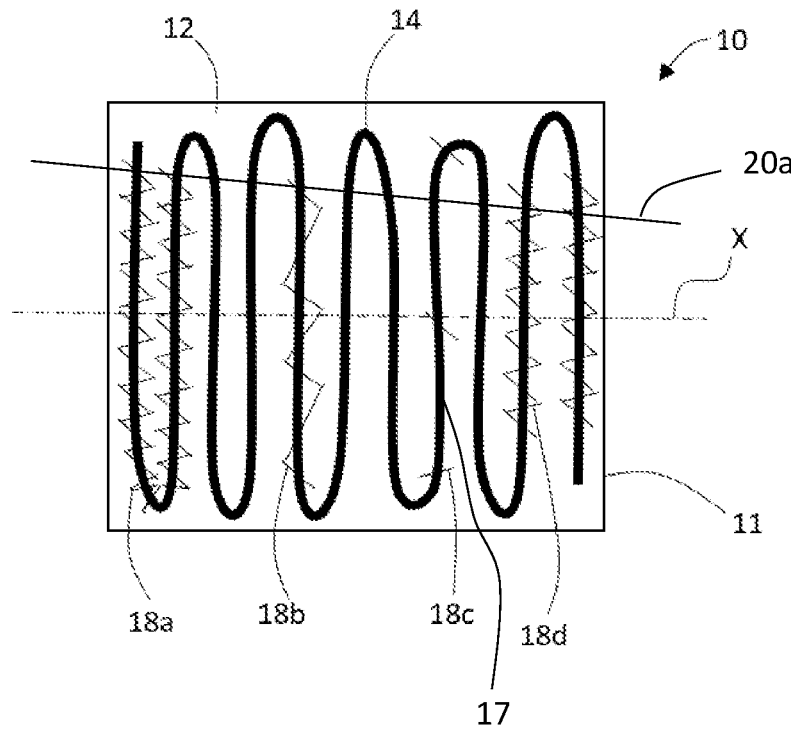
FIG. 1 is a schematic drawing showing a top view of a fiber preform according to embodiments of the present invention.

The present invention has utility as a fiber preform for resin overmolding that has a positioning element associated therewith for properly orienting and aligning the fiber preform with a mold, particularly a mold designed to impart a three-dimensional shape to the preform and resulting composite material component. By providing a preform with such a mistake proof positioning element, common molding mistakes, such as placing the preform in the mold in a rotated position, inverted position, bunched up position, or similar incorrect position, are prevented, thereby reducing waste, production cost, and scrappage, and increasing throughput. Furthermore, providing a preform with such a mistake proof positioning element ensures that when a composite material mold includes three-dimensional geometry such as a corner, corrugations, or other directional changes, the fiber preform is positioned to properly fill such corners, corrugations, or directional changes of the mold to ensure proper resin flow without additional human intervention such as hand layup, thereby reducing operator error, manual labor, waste, production cost, and scrappage, and increasing throughput.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

The present invention provides a fiber preform 10 having a positioning element 20 for properly orienting and aligning the fiber preform with a mold 30, particularly a mold 30 designed to impart a three-dimensional shape 34 to the preform 10 and resulting composite material component. According to embodiments, an inventive fiber preform 10 includes a fiber bundle 14 arranged in a predetermined pattern and attached to itself by a plurality of stitches 18 of a thread to form at least one preform layer 11. The inventive fiber preform 10 additionally includes at least one positioning element 20 associated with the at least one preform layer 11. The positioning element 20 is configured to engage with at least one corresponding alignment element 32 on the mold 30 to indicate proper positioning of the fiber preform 10 within the mold 30.

The fiber bundle 14 is arranged in a predetermined pattern by a selective comingled fiber bundle positioning (SCFBP) method and attached to itself, or according to embodiments a substrate 12, by a plurality of stitches 18 of a thread, which according to some embodiments is a thermoplastic thread.

According to embodiments that include a substrate 12, the substrate 12 acts as a foundation or base upon with a fiber bundle 14 is applied. The substrate 12 may be a tear-off fabric or paper or other suitable material. According to embodiments, the substrate 12 is used as a foundation upon which the fiber bundle 14 is applied in the predetermined pattern but is torn off prior to placement of the fiber preform 10 in the mold 30.

According to embodiments, the fiber bundle 14 is made of reinforcing fibers, such as those made of 100% carbon, 100% glass, or 100% aramid fibers, or a combination thereof. According to certain embodiments, the fiber bundle 14 includes matrix fibers, being of a thermofusible nature may be formed from a thermoplastic material such as, for example, polypropylenes, polyamides, polyesters, polyether ether ketones, polybenzobisoxazoles, polyphenylene sulfide; block copolymers containing at least of one of the aforementioned constituting at least 40 percent by weight of the copolymer; and blends thereof. The thermoplastic fibers are appreciated to be recycled, virgin, or a blend thereof. The thermofusible thermoplastic matrix fibers have a first melting temperature at which point the solid thermoplastic material melts to a liquid state. The reinforcing fibers may also be of a material that is thermofusible provided their thermofusion occurs at a temperature which is higher than the first melting temperature of the matrix fibers so that, when both fibers are used to create a composite, at the first melting temperature at which thermofusibility of the matrix fibers occurs, the state of the reinforcing fibers is unaffected.

As used herein, any reference to weight percent or by extension molecular weight of a polymer is based on weight average molecular weight.

As used herein, the term melting as used with respect to thermoplastic fibers or thread is intended to encompass both thermofusion of fibers such that a vestigial core structure of separate fibers is retained, as well as a complete melting of the fibers to obtain a homogenous thermoplastic matrix.

Figure 2:
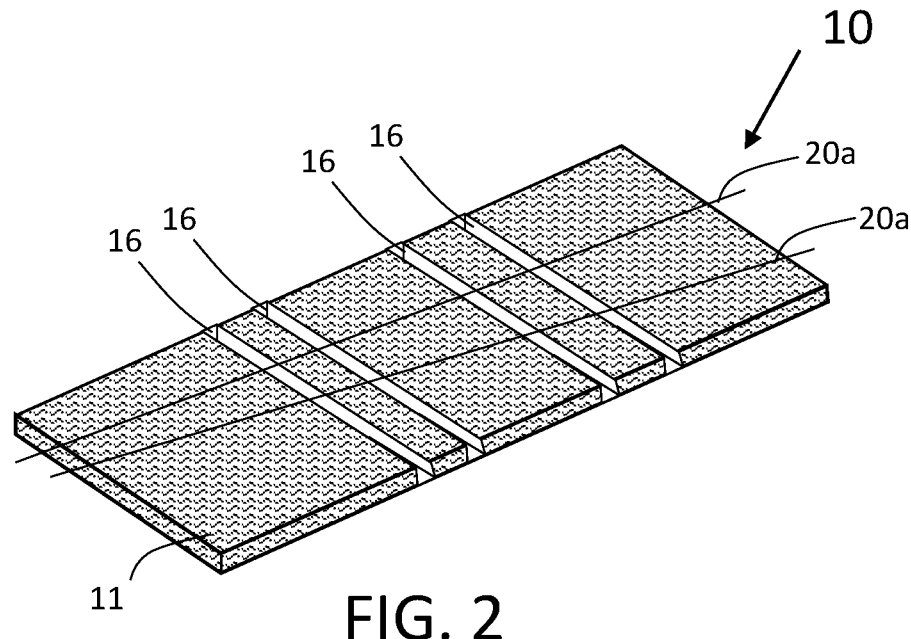
FIG. 2 is a perspective view of a fiber preform according to embodiments of the present invention.

The predetermined pattern in which the fiber bundle 14 is arranged may generally resemble the shape of the designed final composite material component, for example a structural component of an automobile. The fiber bundle 14 may be arranged in a principal direction, i.e. a principal direction of stress of the final composite material component. In FIG. 1, the principal orientation of the fiber bundle 14 is along a longitudinal axis X of the fiber preform 10, however, other suitable orientations are also possible and may be used based on the design considerations and stresses for each composite material part. According to embodiments, the predetermined pattern in which the fiber bundle 14 is arranged includes gaps between portions of the fiber bundle 14 such that the at least one preform layer 11 includes at least one area 16 that is void or lower thread density of the fiber bundle 14 in a location where the at least one preform layer is configured to bend, as shown in FIG. 2. Such an area 16 that is void of the fiber bundle 14 allows the fiber preform 10 to bend easily to properly fill any bends, corners, corrugations, or directional changes of the mold 30 to ensure proper resin flow without additional human intervention such as hand layup. While the areas 16 that are void of the fiber bundle 14 are only shown in FIG. 2 for clarity, it should be understood that such void areas 16 may be utilized with any and all embodiments of the inventive fiber preform 10 disclosed herein.

The fiber bundle 14 is attached to itself and/or to a substrate 12 by a plurality of stitches 18 of thread. In some embodiments, the thread is a thermoplastic thread, such as nylon. Referring again to FIG. 1, the plurality of stitches 18 are shown in various zig-zag stitch arrangements. For example, the stitches may be closely spaced stitches 18a and 18d or spaced apart by a greater linear distance such as stitches 18b and 18c. The stitches may be continuously connected along the fiber bundle 14 such as stitches 18a, or the stitches may be discrete and separate single stitches 18c or separate groups of stitches such as stitches 18b and 18d. According to embodiments, the fiber preform 10 includes at least one area 17 of less dense stiches in a location where the at least one preform layer is configured to bend. Such an area 17 that includes fewer stitches 18 allows the fiber preform 10 to bend easily to properly fill any bends, corners, corrugations, or directional changes of the mold 30 to ensure proper resin flow without additional human intervention such as hand layup. While the areas 17 that have fewer stitches 18 are only shown in FIG. 1 for clarity, it should be understood that such areas 17 may be utilized with any and all embodiments of the inventive fiber preform 10 disclosed herein.

FIG. 1 illustrates only a first preform layer 11. According to some embodiments, the fiber preform 10 includes at least one preform layer 11. According to some embodiments of the present invention, the fiber preform includes a plurality of subsequent preform layers formed of the fiber bundle 14 successively stacked from the first preform layer 11. Each subsequent preform layer is arranged on a preceding preform layer and is attached to the preceding preform layer by additional stitches of the thread. The fiber bundle 14 that forms each of the subsequent preform layers may be a continuation of the fiber bundle of the preceding preform layer or it could be a separate piece of fiber bundle.

The details of forming such a preform are detailed in co-pending provisional applications 62/486,288 entitled "VEHICLE COMPONENT BASED ON SELECTIVE COMINGLED FIBER BUNDLE POSITIONING FORM," 62/486,368 entitled "VEHICLE COMPONENT BASED ON SELECTIVE COMMINGLED FIBER BUNDLE POSITIONING PREFORM CURED IN A THERMOSET RESIN MATRIX," and 62/486,166 entitled "FIBER PREFORM AND METHOD OF MAKING THE SAME."

Figure 3A:
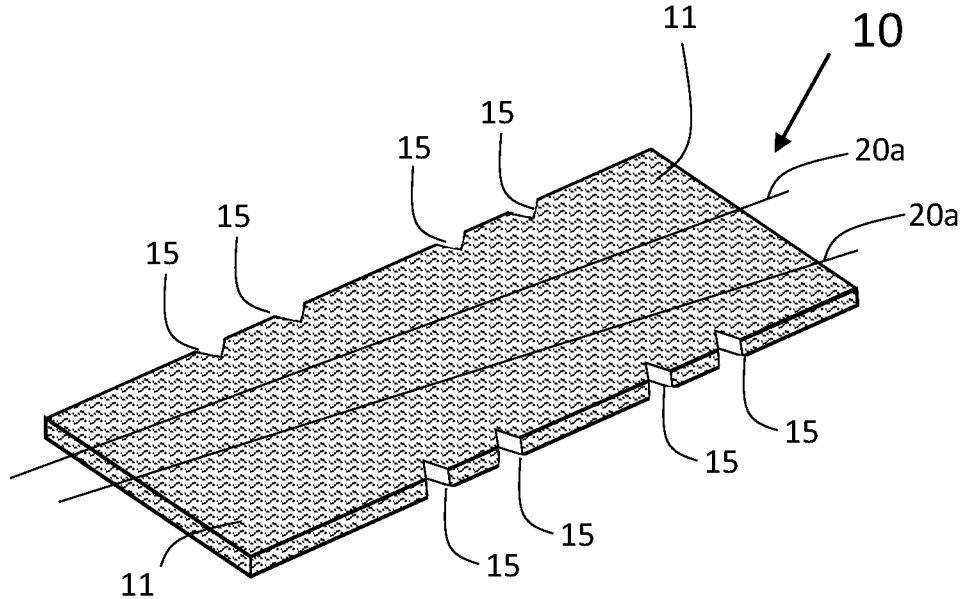
FIG. 3A is a perspective view of a fiber preform according to embodiments of the present invention.
Figure 3B:
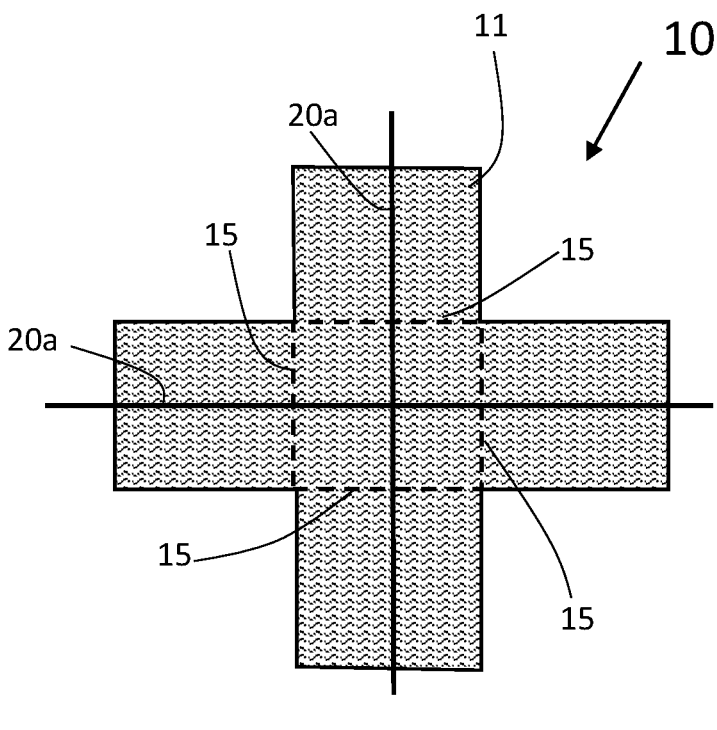
FIG. 3B is a perspective view of a fiber preform according to embodiments of the present invention.
Figure 3C:
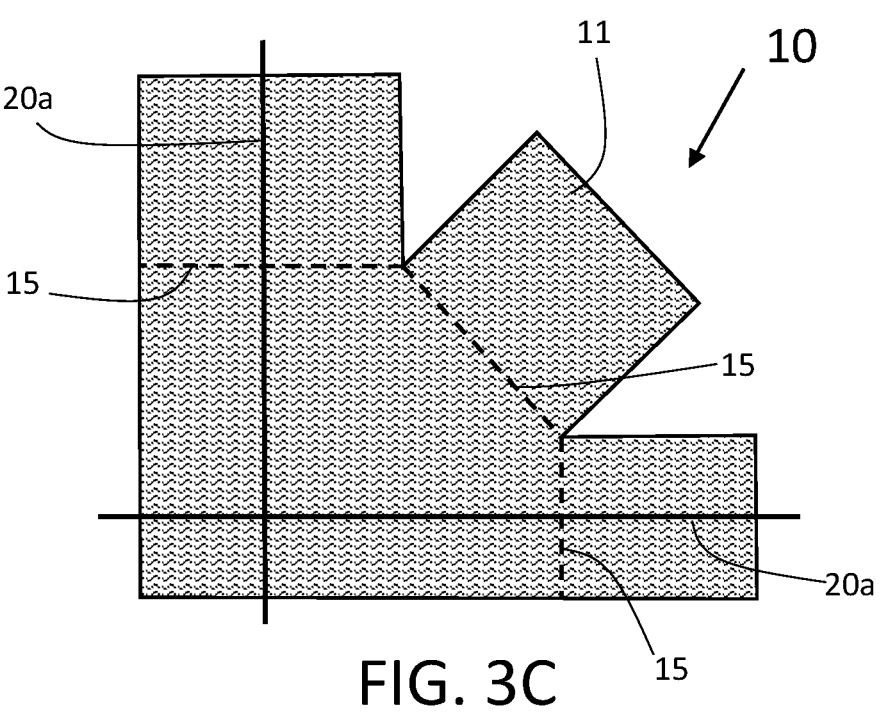
FIG. 3C is a perspective view of a fiber preform according to embodiments of the present invention.

As shown throughout the figures, the fiber preform 10 has a generally two-dimensional shape, that is, while the at least one preform layer 11 or plurality of preform layers gives the fiber preform 10 a thickness, the fiber preform is substantially flat or planar. Often, it is desired that the composite materials formed using a fiber preform above described have a three-dimensional shape, for example a curve, an angle, or some other non-planar configuration. Additionally, it is often desired to produce a composite part that has a corrugated core to increase strength. It has been found that achieving a suitable fit between the generally two-dimensional fiber preform 10, as shown in FIGS. 4A-10B, and a three-dimensional overmolding mold 30 is difficult and often results in improper fit in the mold, voids between the insert and the mold surface or wrinkles in the insert. Such voids, wrinkles, and other undesirable alignment issues lead to concentrations or voids of resin, weak points, poor resin infiltration, and cracking in the final composite material parts. As noted above, embodiments of the fiber preform 10 provide at least one area 16 void of the fiber bundle 14 and or at least one area 17 with fewer stitches 18 in a location where the at least one preform layer is configured to bend to avoid such improper fits within the mold 30. According to further embodiments, the at least one preform layer 11 includes at least one slit 15, as shown in FIGS. 3A-3C, in a location where the at least one preform layer is configured to bend to similarly allow the fiber preform 10 to bend easily in order to properly fill directional changes within the mold 30 and fill the mold 30 to avoid areas of reinforcement or resin voids. While the slits 15 are only shown in FIGS. 3A-3C for clarity, it should be understood that such slits 15 may be utilized with any and all embodiments of the inventive fiber preform 10 disclosed herein.

While many of the figures show the fiber preform 10 as a rectangular piece of material, it should be understood that the fiber preform 10 may be formed as any generally planar shape, such as those shown in FIGS. 3B and 3C. Any of the above mentioned areas 16 void of the fiber bundle 14, areas 17 with fewer stitches 18 in a location where the at least one preform layer is configured to bend, and/or slits 15 where the preform 10 is configured to bend may be utilized in a preform 10 of any initial shape in order to form composite components having a variety of three dimensional shapes including bends, corrugations, or other directional changes. For example, the fiber preform 10 shown in FIG. 3B initially has a plus sign shape with slits 15 provided at areas where the preform 10 is intended to bend to fit within a mold 30. The preform 10 shown in FIG. 3B ultimately will form a cube-shaped composite material having a high aspect ratio when the fiber preform 10 is bent along the slits 15. Similarly, the fiber preform shown in FIG. 3C will be used to form a composite material having a high-aspect ratio when the fiber preform 10 is bent along the slits 15. It should be understood that while many of the inventive features described herein are shown and described with relation to a rectangular fiber preform 10, any of the inventive features described herein may be used with preforms 10 having non-rectangular shapes, such as those shown in FIGS. 3B and 3C.

Figure 4A:
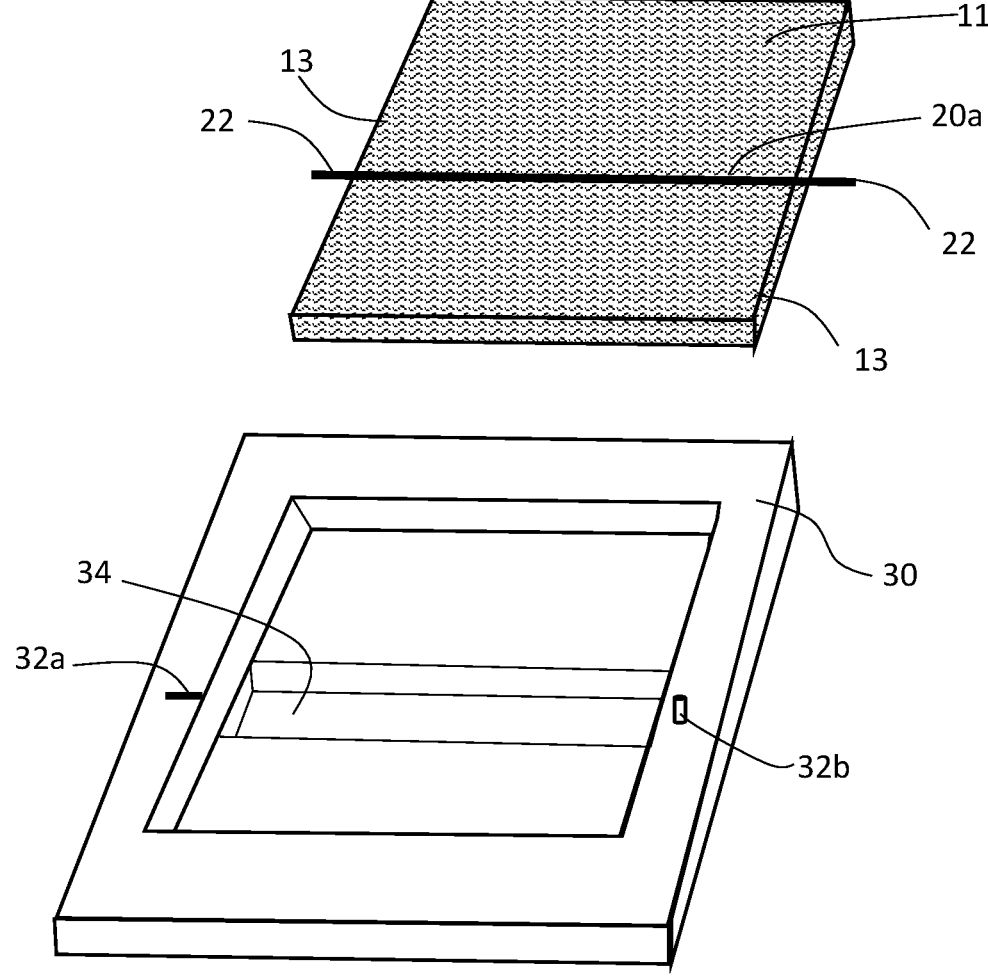
FIG. 4A is a perspective view of a fiber preform separated from a corresponding mold according to embodiments of the present invention.
Figure 4B:
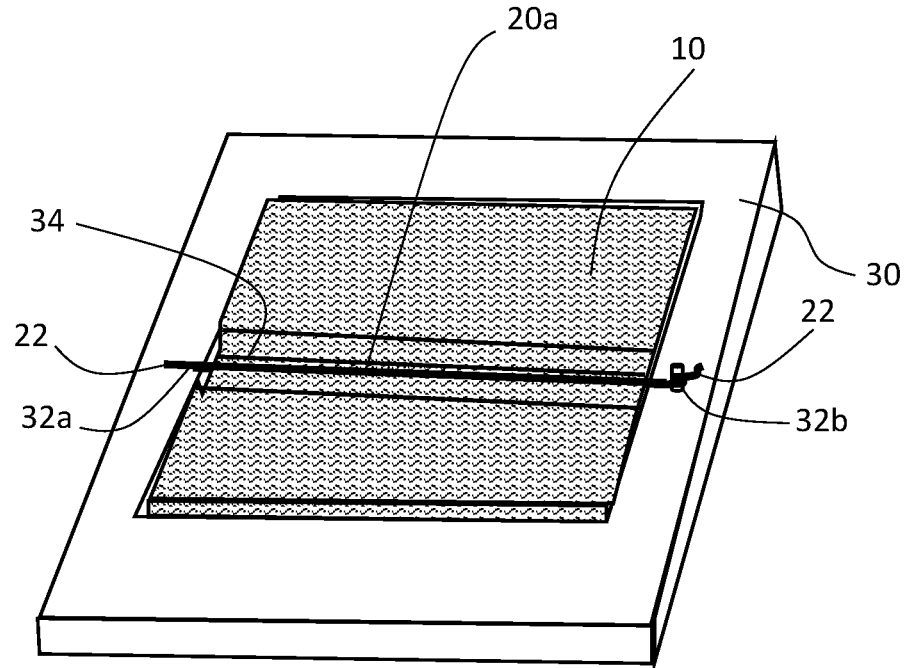
FIG. 4B is a perspective view of the fiber preform of FIG. 4A properly positioned within the mold of FIG. 4A.

As noted above, the inventive fiber preform 10 additionally includes at least one positioning element 20 associated with the at least one preform layer 11. The positioning element 20 is configured to engage with at least one corresponding alignment element 32 on the mold 30 to indicate proper positioning of the fiber preform 10 within the mold 30. That is, to indicate that the fiber preform 10 is right-side up relative to the mold 30, is rotationally aligned with the mold 30 as intended, in a position where the fiber preform 10 will fill the bends, corners, corrugations, or other directional changes within the mold as intended, or a combination thereof. According to embodiments, the fiber preform 10, when flat, is larger than the mold 30 to allow the fiber preform 10 to bend as intended to fill any bends, corners, corrugation, or other direction changes 34 present in the mold 30. According to embodiments, the positioning element 20 is positioned in line with an area of the fiber preform 10 that is configured to fill any bends, corners, corrugation, or other direction changes 34 present in the mold 30 in order to ensure the proper alignment of such areas of the preform 10 with those areas 34 of the mold 30. For example, the positioning element 20 may be located in line with an area 16 void of the fiber bundle 14, an area 17 with fewer stitches 18 in a location where the preform 10 is configured to bend to fit within the mold 30, and/or at least one slit 15 in a location where the preform 10 is configured to bend. Providing a positioning element 20 in line with such a portion of the fiber preform 10 that is intended to be positioned within a directional change 34 of a mold ensures that the fiber preform 10 is properly aligned with the mold so the directional changes 34 of the mold 30 are properly filled with the fiber preform 10. While not all figures provided herein show a positioning element 20 positioned on the fiber preform 20 specifically for aligning an area of the fiber preform 10 with a directional change 34 defined in the mold 30 (such as shown in FIGS. 4A and 4B), it should be understood that the present invention contemplates the use of such positioning elements 20 with any and all embodiments disclosed herein. According to embodiments, the positioning element 20 is asymmetrically positioned relative to the at least one preform layer 11, so that the positioning element 20 is only able to engage with the at least one corresponding alignment element 32 on the mold 30 when the fiber preform 10 is properly oriented and aligned with the mold 30, that is when the fiber preform 10 is right-side up relative to the mold 30, is rotationally aligned with the mold 30 as intended, and in a position where the fiber preform 10 will fill the bends, corners, corrugations, or other directional changes within the mold as intended.

Figure 4C:
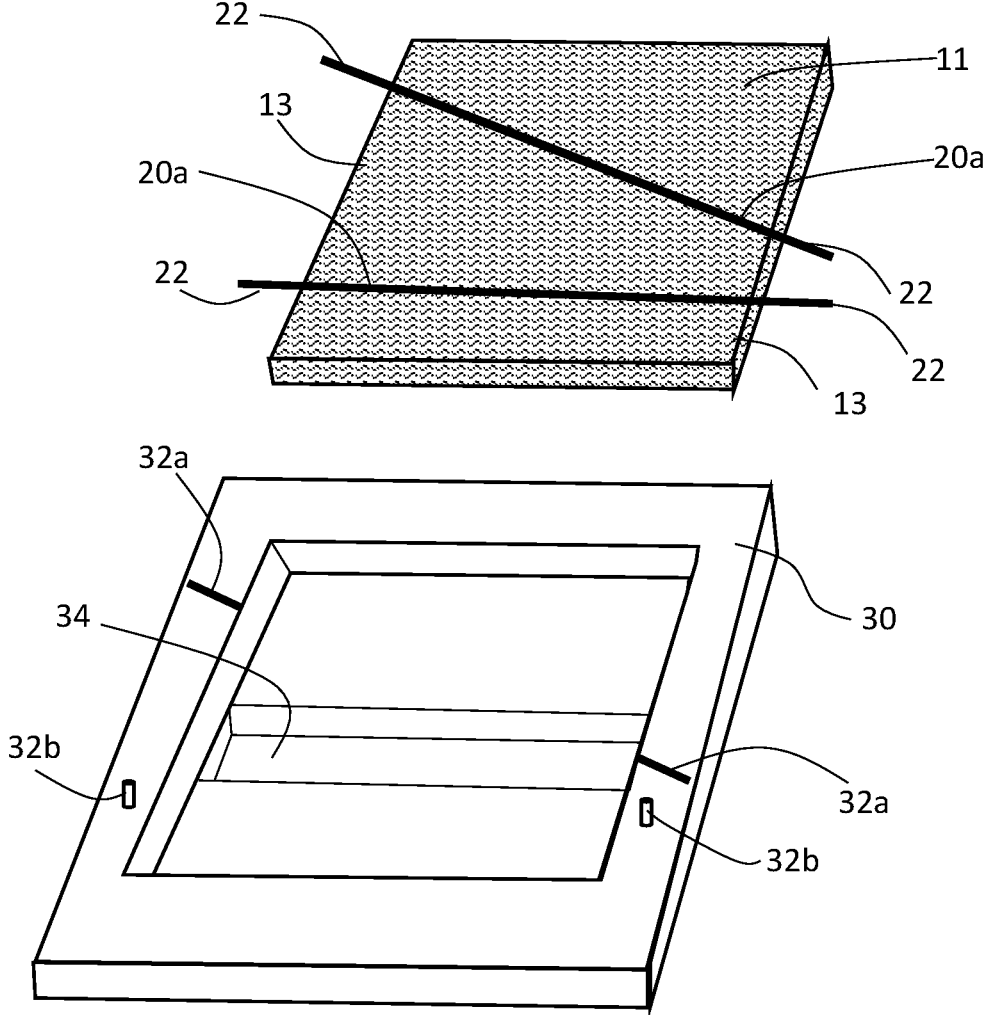
FIG. 4C is a perspective view of a fiber preform separated from a corresponding mold according to embodiments of the present invention.
Figure 4D:
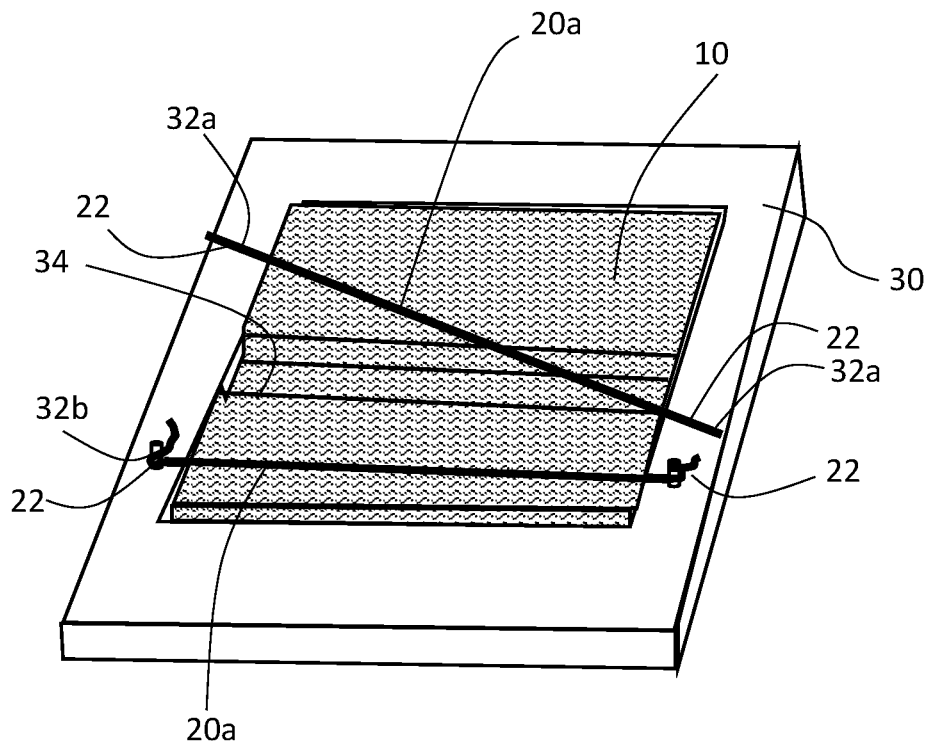
FIG. 4D is a perspective view of the fiber preform of FIG. 4C properly positioned within the mold of FIG. 4C.

According to embodiments, the at least one positioning element 20a is at least one additional thread stitched to the at least one preform layer 11, as shown in FIG. 4A. According to embodiments, the additional thread is a visually distinct color, such as red, orange, blue, or any color that stands out from the color of the at least one preform layer 11. According to embodiments, the additional thread is stitched to the at least one preform layer 11 in a straight line that extends between at least two edges 13 of the at least one preform layer 11. The ends 22 of the additional thread may stop at the edges 13 of the preform layer 11 or may extend beyond the edges 13 of the preform layer 11. According to embodiments, as shown in FIGS. 4A and 4B, the at least one additional thread positioning element 20a is positioned in an area of the fiber preform 10 that is intended to be aligned with the directional change corrugation 34 of the mold 30, such that the at least one additional thread positioning element 20a runs parallel to the corrugation 34 defined in the mold 30. According to embodiments, the at least one additional thread positioning element 20a is provided as a straight or curved line. The ends 22 of the additional thread positioning element 20s are configured to be lined up with corresponding alignment element 32 on the mold 30, which for example are marks 32a provided on the mold 30 surface or catches or pegs 32b for securing the ends 22 of the additional thread 20a to ensure proper rotational alignment of the fiber preform 10 with the mold 30, as shown in FIG. 4B. It is appreciated that two pegs 32b are also present in opposition instead of the single peg 32b and mark 32a depicted. As shown in FIGS. 4C and 4D, the at least one additional thread positioning element 20a may include multiple threads 20a for aligning the fiber preform 10 with the mold 30 and any directional changes 34 defined therein.

Figure 5A:
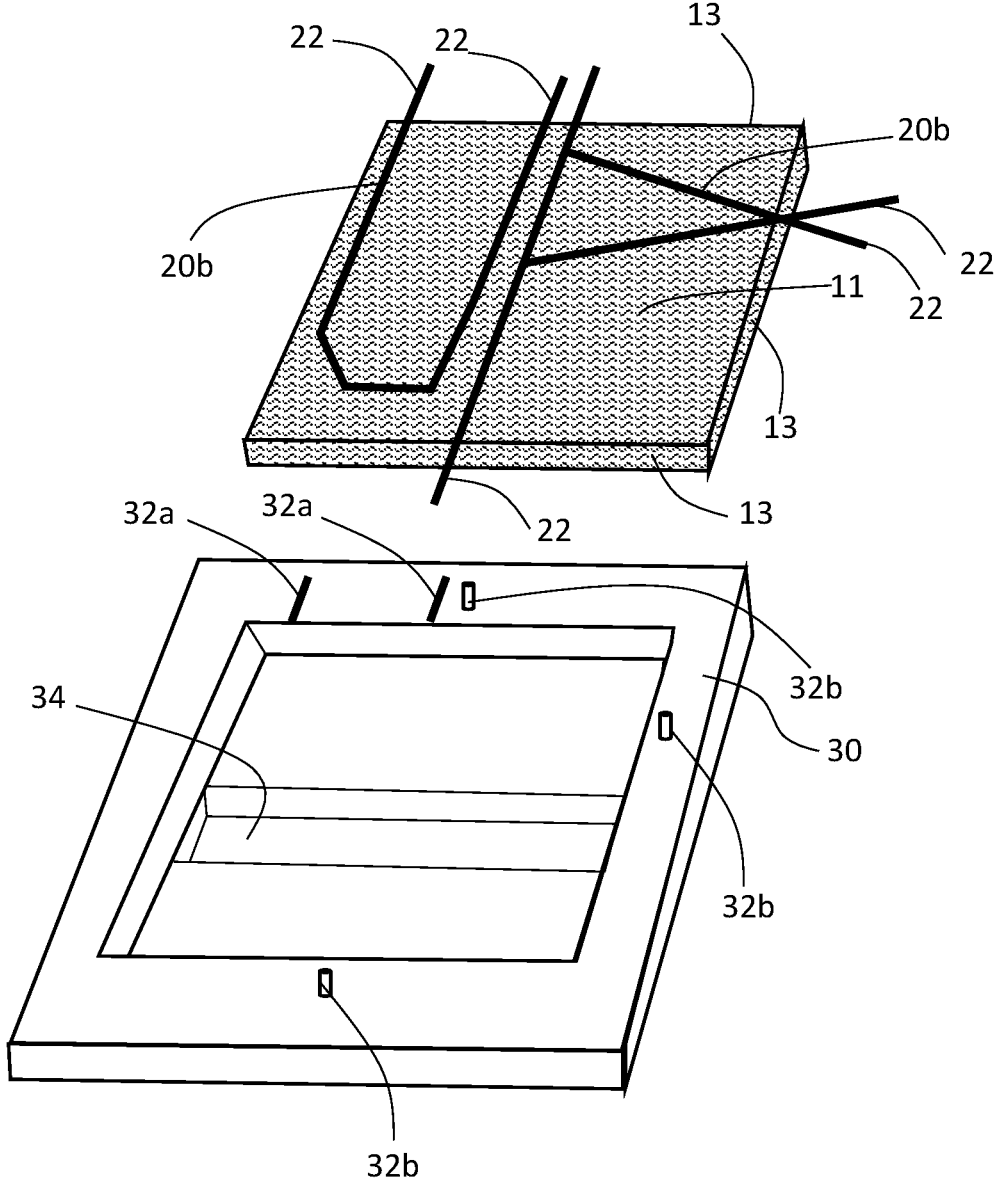
FIG. 5A is a perspective view of a fiber preform separated from a corresponding mold according to embodiments of the present invention.
Figure 5B:
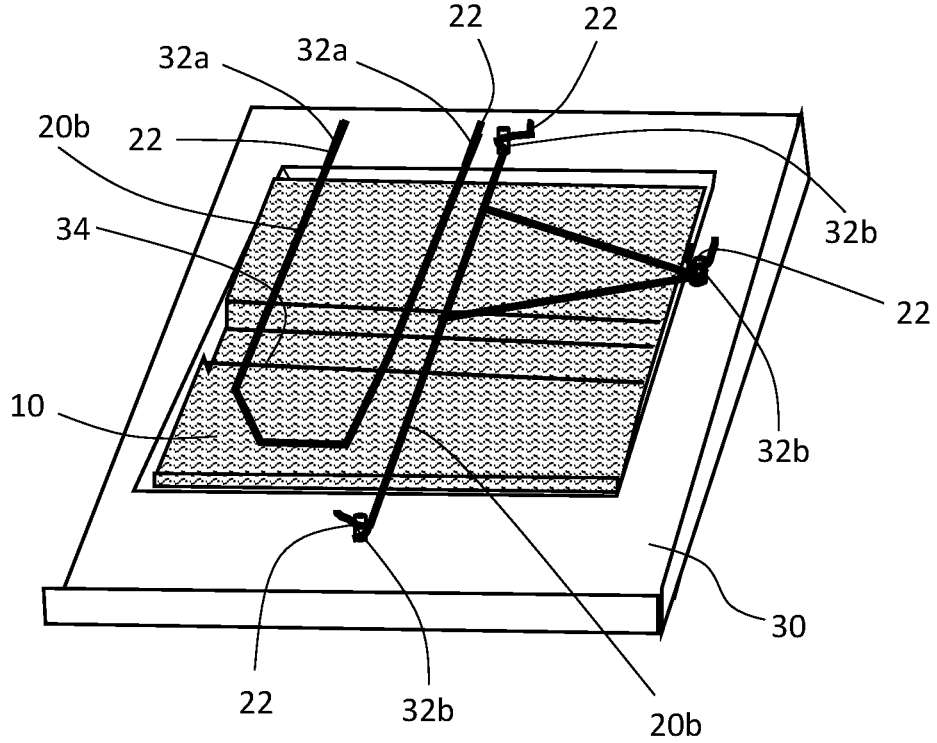
FIG. 5B is a perspective view of the fiber preform of FIG. 5A properly positioned within the mold of FIG. 5A.

According to embodiments, the at least one positioning element 20b is an embroidered design stitched to the at least one preform layer 11, as shown in FIG. 5A. According to embodiments, the embroidered design is a visually distinct color, such as red, orange, blue, or any color that stands out from the color of the at least one preform layer 11. According to embodiments, the embroidered design is stitched to the at least one preform layer 11 such that it touches at least three edges 13 of the at least one preform layer 11. The ends 22 of the embroidered design may stop at the edges 13 of the preform layer 11 or may extend beyond the edges 13 of the preform layer 11. According to embodiments, the embroidered design positioning element 20b is provided as a combination of straight and/or curved lines. According to embodiments, the embroidered design positioning element 20b spells a word, such as "TOP" or "UP" to provide further indication regarding the right-side-up orientation of the fiber preform 10 relative to the mold 30. The ends 22 of the embroidered design positioning element 20b are configured to be lined up with corresponding alignment element 32 on the mold 30, which for example are marks 32a provided on the mold 30 surface or catches or pegs 32b for securing the ends 22 of the embroidered design 20b to ensure proper rotational alignment of the fiber preform 10 with the mold 30, as shown in FIG. 5B. It should also be appreciated that in some inventive embodiments, the word is also positioned on the preform 10 beyond the cavity of the mold 30.

Figure 6A:
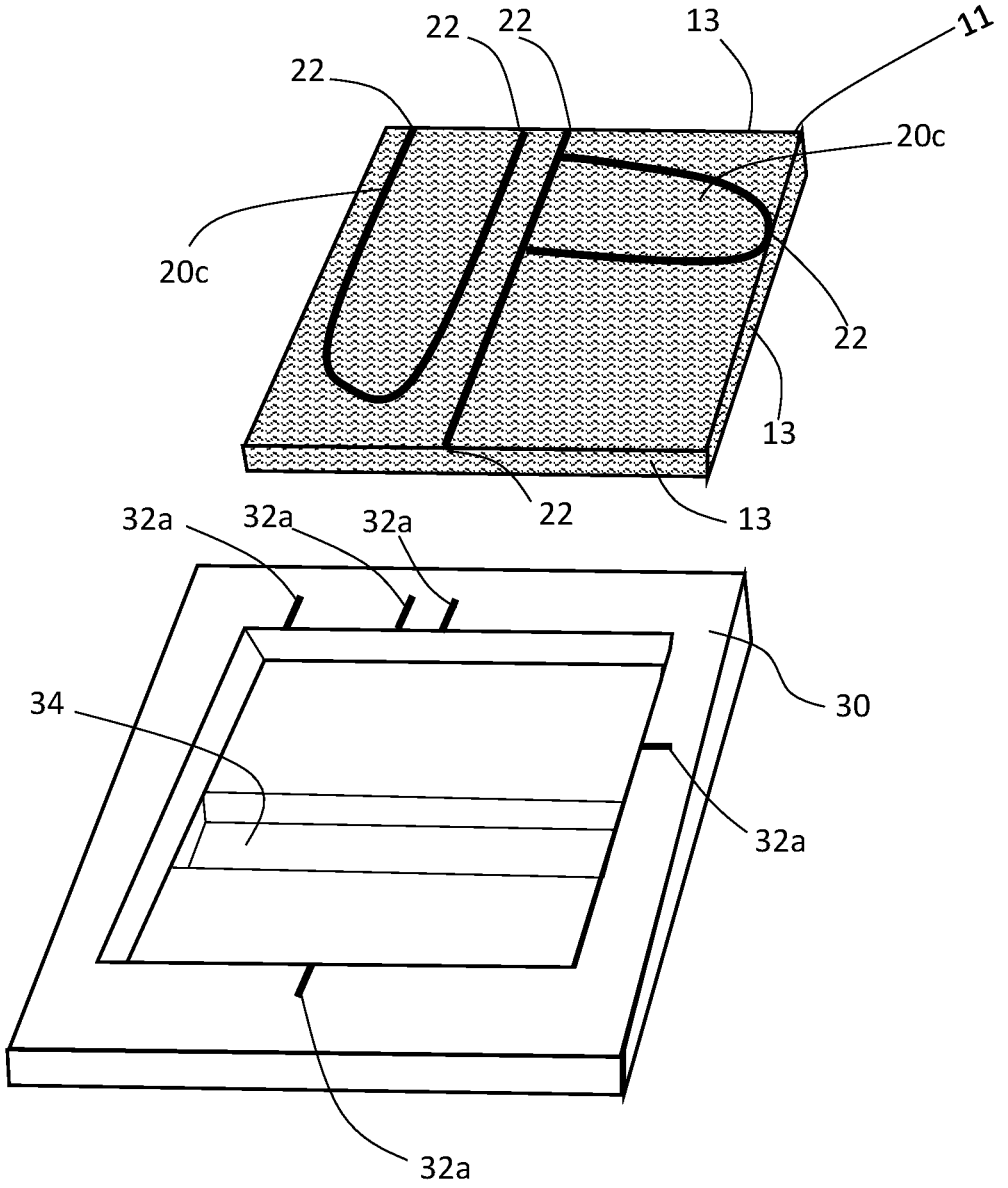
FIG. 6A is a perspective view of a fiber preform separated from a corresponding mold according to embodiments of the present invention.
Figure 6B:
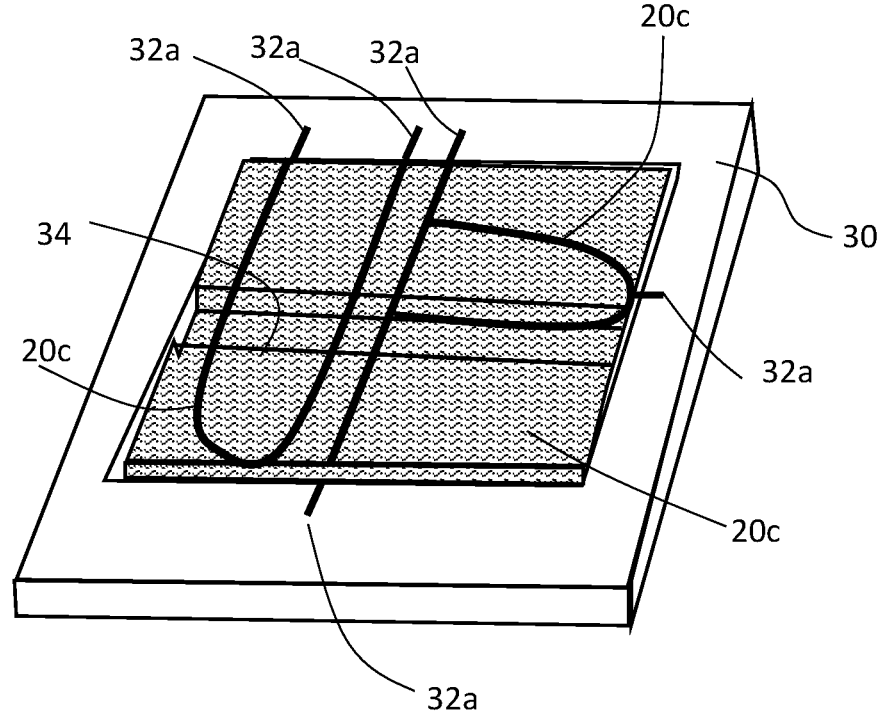
FIG. 6B is a perspective view of the fiber preform of FIG. 6A properly positioned within the mold of FIG. 6A.

According to embodiments, the at least one positioning element 20c is painted design painted onto a right-side-up surface of the at least one preform layer 11, as shown in FIG. 6A. According to embodiments, the painted design is a visually distinct color, such as red, orange, blue, or any color that stands out from the color of the at least one preform layer 11. According to embodiments, the painted design extends between at least two edges 13 of the at least one preform layer 11. According to embodiments, the painted design 20c touches at least three edges 13 of the at least one preform layer 11. According to embodiments, the painted design positioning element 20c is provided as a combination of straight and/or curved lines. According to embodiments, the painted design positioning element 20c spells a word, such as "TOP" or "UP" to provide further indication regarding the right-side-up orientation of the fiber preform 10 relative to the mold 30. The ends 22 of the painted design positioning element 20c are configured to be lined up with corresponding alignment elements 32 on the mold 30, which for example are marks 32a provided on the mold 30 surface to ensure proper rotational alignment of the fiber preform 10 with the mold 30, as shown in FIG. 6B. It should also be appreciated that in some inventive embodiments, the word is also positioned on the preform 10 beyond the cavity of the mold 30.

Figure 7A:
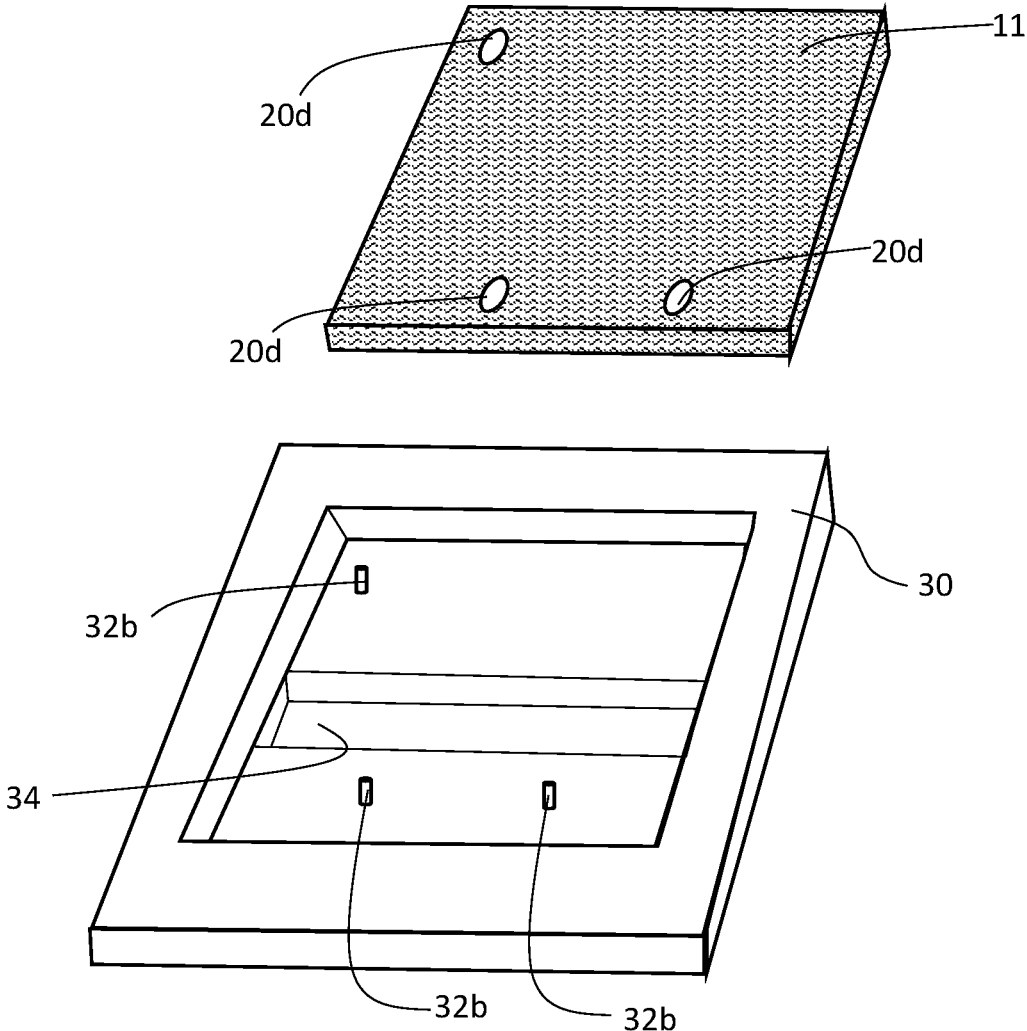
FIG. 7A is a perspective view of a fiber preform separated from a corresponding mold according to embodiments of the present invention.
Figure 7B:
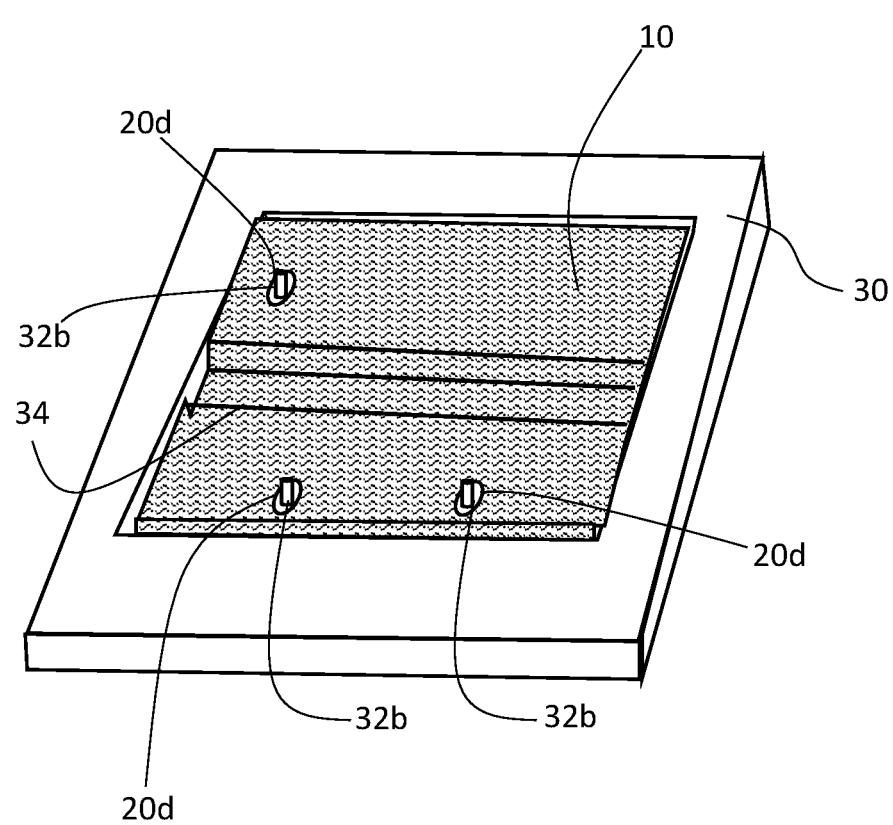
FIG. 7B is a perspective view of the fiber preform of FIG. 7A properly positioned within the mold of FIG. 7A.

According to embodiments, the at least one positioning element 20d is a plurality of holes formed in the at least one preform layer 11, as shown in FIG. 7A. According to embodiments, the plurality of holes positioning elements 20d include at least three holes. According to embodiments, the plurality of holes positioning elements 20d are formed in the preform layer 11 as the fiber bundle 14 is arranged in the predetermined pattern or the plurality of holes 20d may be subsequently cut from the at least one preform layer 11. According to embodiments, the plurality of holes 20d are provided with different sizes and/or shapes such as triangles, circles, squares, and/or rectangles. The multi shaped holes 20d help to ensure that the rotational alignment of the fiber preform 10 with the mold 30 is correct and that the fiber preform 10 is unable to engage with the mold 30 unless it is properly oriented and aligned. The plurality of holes positioning elements 20d are configured to engage with corresponding alignment elements 32 on the mold 30, which for example are pegs 32b of corresponding shapes provided on the mold 30 surface around which the holes 20d are placed to ensure proper rotational alignment of the fiber preform 10 with the mold 30, as shown in FIG. 7B. According to embodiments, the peg alignment elements 32b are tapered so the holes 20 may easily be positioned on the alignment pegs 32b with the use of gravity.

Figure 8A:
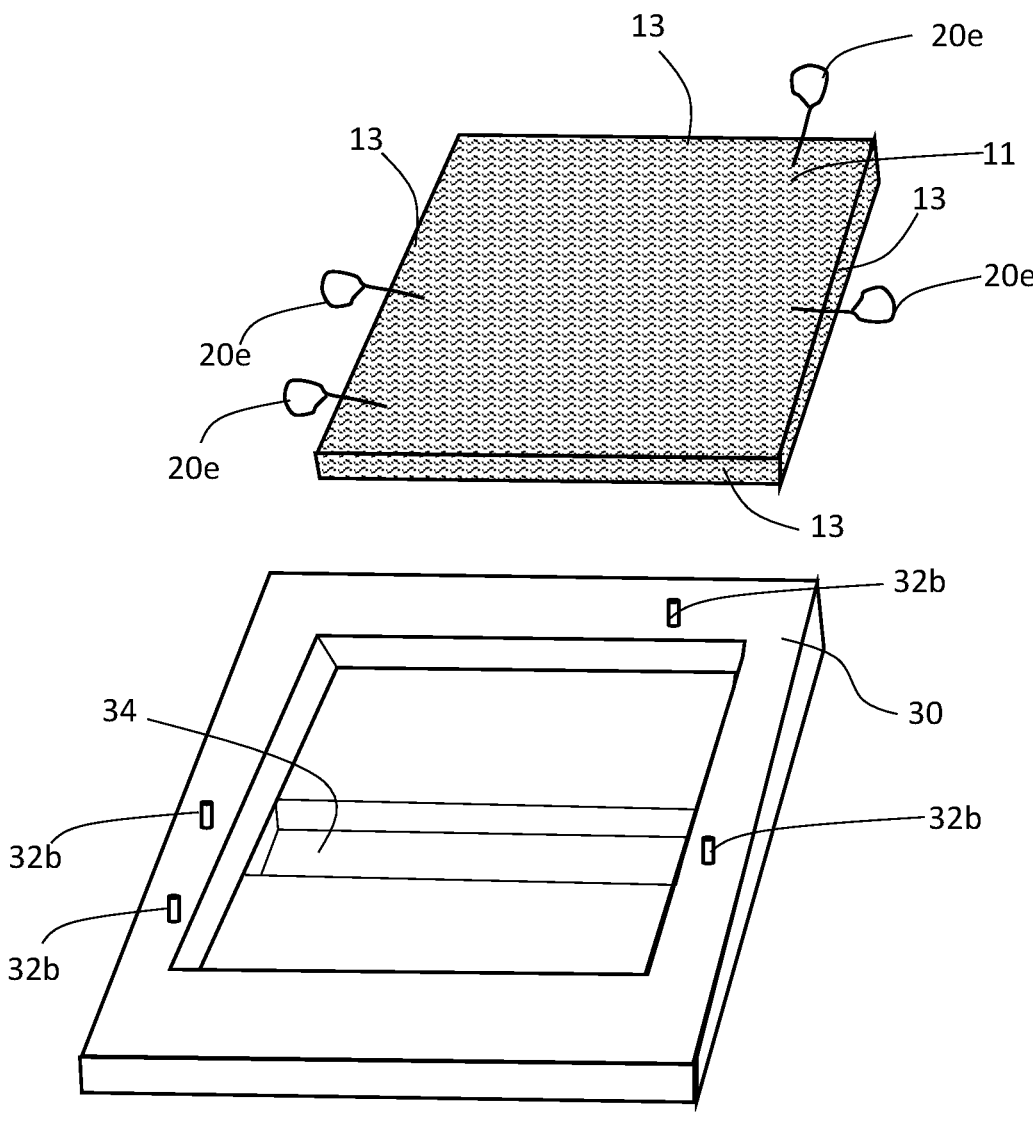
FIG. 8A is a perspective view of a fiber preform separated from a corresponding mold according to embodiments of the present invention.
Figure 8B:
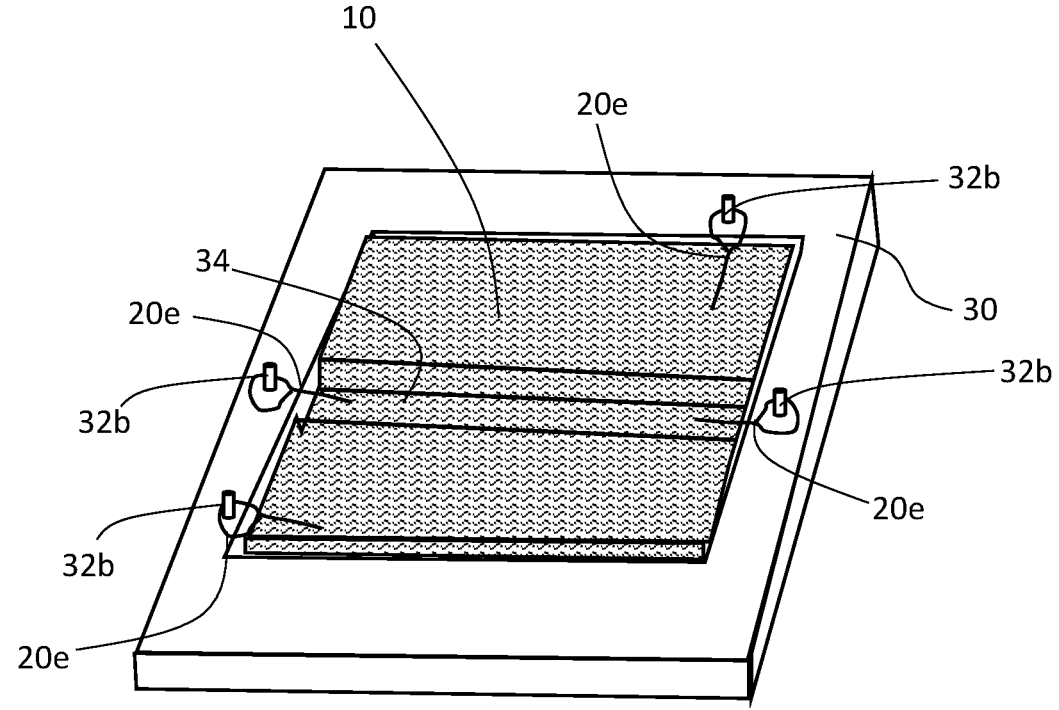
FIG. 8B is a perspective view of the fiber preform of FIG. 8A properly positioned within the mold of FIG. 8A.

According to embodiments, the at least one positioning element 20e is a plurality of loops extending from the at least one preform layer 11, as shown in FIG. 8A. According to embodiments, the plurality of loops 20e include at least three loops. According to embodiments, the plurality of loops 20e extend from the edges 13 of the at least one preform layer 11. According to embodiments, the plurality of loops 20e are formed of a thread material and are stitched to the at least one preform layer 11. The plurality of loop positioning elements 20e are configured to engage with corresponding alignment elements 32 on the mold 30, which for example are pegs 32b provided on the mold 30 surface around which the loops 20e are placed to ensure proper rotational alignment of the fiber preform 10 with the mold 30, as shown in FIG. 8B. According to embodiments, the peg alignment elements 32b are tapered so the loops 20e may easily be positioned on the alignment pegs 32b with the use of gravity. According to embodiments, the loops 20e and corresponding pegs 32b may be provided in various sizes and shapes to further eliminate the possibility of misalignment of the fiber preform 10 with the mold 30. As shown in FIGS. 8A and 8B, some of the loops 20e are located on the fiber preform 10 in an area that is intended to be positioned within a corrugation 34 defined in the mold 30.

Figure 9A:
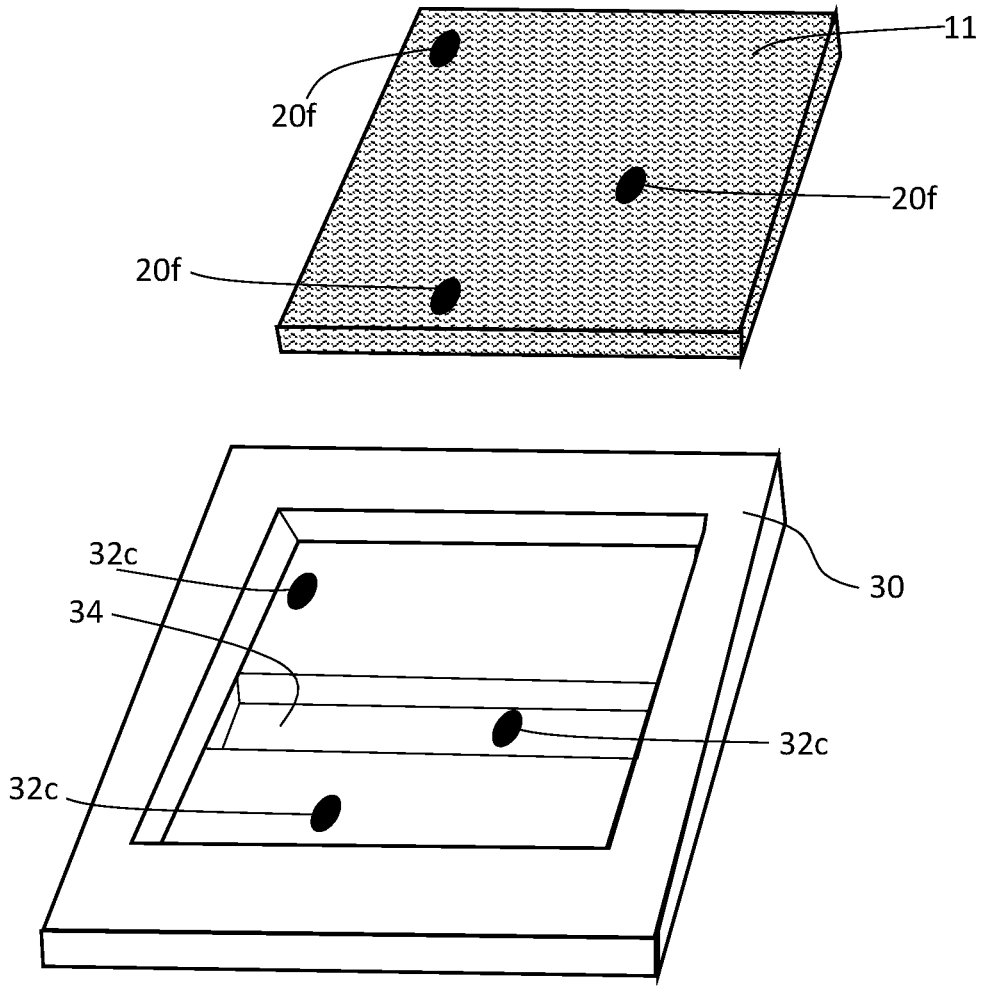
FIG. 9A is a perspective view of a fiber preform separated from a corresponding mold according to embodiments of the present invention.
Figure 9B:
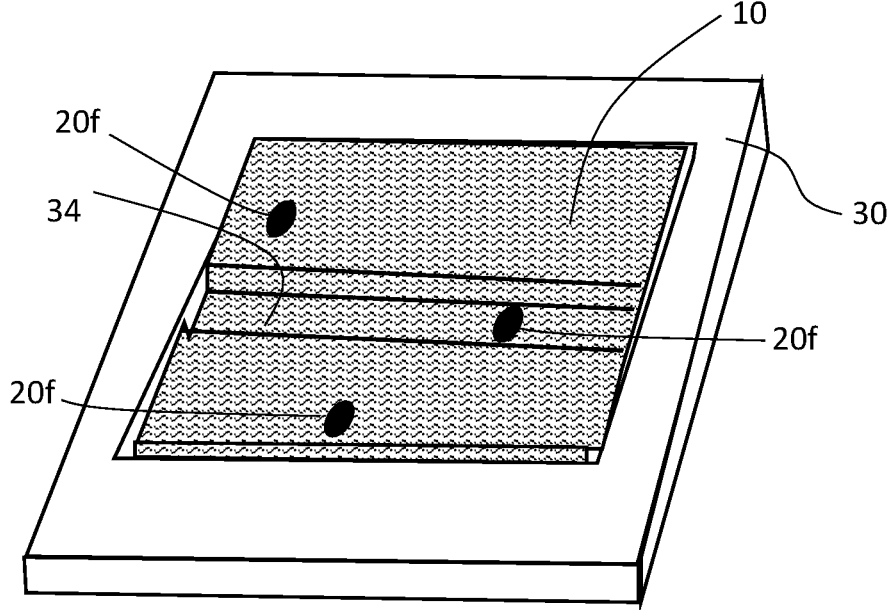
FIG. 9B is a perspective view of the fiber preform of FIG. 9A properly positioned within the mold of FIG. 9A.

According to embodiments, the at least one positioning element 20f is a plurality of magnetic elements attached to the at least one preform layer 11, as shown in FIG. 9A. The magnetic element positioning elements 20f may be sewn into the preform layer 11 or may be inserted into pockets that are attached to the preform layer 11. According to embodiments, the plurality of magnetic element positioning elements 20f include at least three magnets. The plurality of magnetic element positioning elements 20f are configured to engage with corresponding alignment elements 32 on the mold 30, which for example are corresponding magnetic elements 32c on the mold 30 surface to which the magnetic element positioning elements 20f are attracted to ensure proper rotational alignment of the fiber preform 10 with the mold 30, as shown in FIG. 9B. As shown in FIGS. 9A and 9B, some of the magnetic elements 20f are located on the fiber preform 10 in an area that is intended to be positioned within a corrugation 34 defined in the mold 30.

Figure 10A:
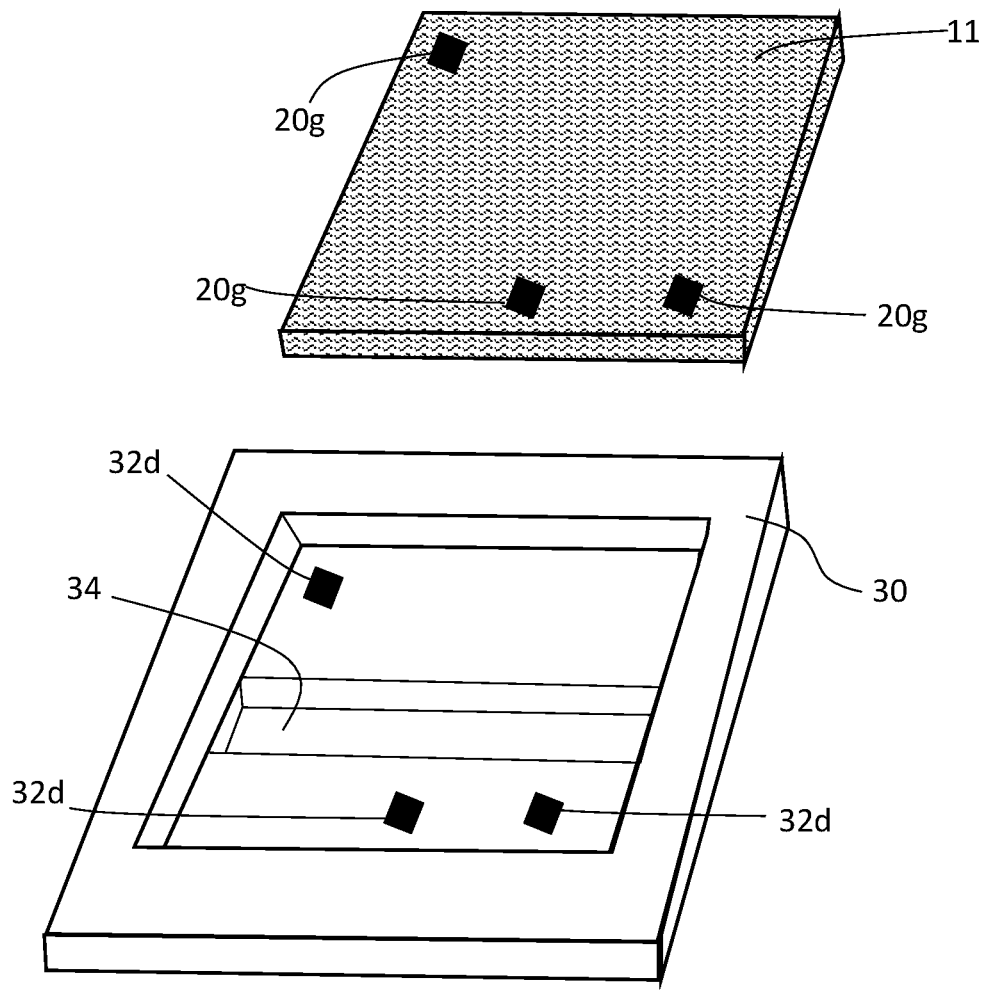
FIG. 10A is a perspective view of a fiber preform separated from a corresponding mold according to embodiments of the present invention.
Figure 10B:
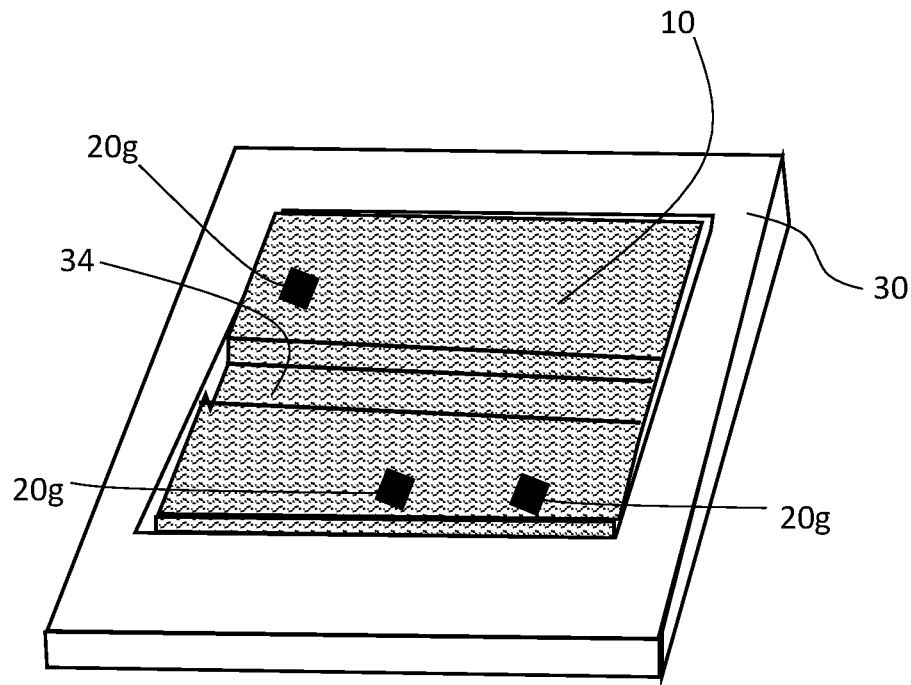
FIG. 10B is a perspective view of the fiber preform of FIG. 10A properly positioned within the mold of FIG. 10A.

According to embodiments, the at least one positioning element 20g is at least one RFID tag attached to the at least one preform layer 11, as shown in FIG. 10A. The RFID tag positioning element 20g may be sewn into the preform layer 11 or may be inserted into a pocket that is attached to the preform layer 11. According to embodiments, the RFID tag positioning element 20g is configured to be read by a corresponding alignment element 32 on the mold 30, which for example is an RFID reader 32d or sensor on the mold 30 surface to ensure proper rotational alignment of the fiber preform 10 with the mold 30, as shown in FIG. 10B.

It will be understood that any of the above described various positioning elements 20 as shown in FIGS. 4A-10B, may be used alone or in combination with one another.

According to embodiments, an inventive fiber preform 10 is used in an overmolding process according to the following method. First, an inventive fiber preform 10 having a positioning element 20 is provided. The positioning element 20 is then engaged with at least one corresponding alignment element 32 on the mold 30 to indicate proper positioning of the fiber preform within the mold. Once proper alignment of the fiber preform 10 within the mold 30 has been established, the fiber preform 11 is overmolded with a resin material. According to embodiments, in which the mold 30 has a three-dimensional shape, the method may additionally include urging the fiber preform 10 to conform to the three-dimensional shape 34 of the mold 30 after engaging the at least one positioning element 20 of the fiber preform 10 with the at least one corresponding alignment element 32 on the mold 30. According to embodiments, this urging occurs by closing an upper portion of the mold 30 onto the fiber preform 10.

The foregoing description is illustrative of particular embodiments of the invention, but is not meant to be a limitation upon the practice thereof. The following claims, including all equivalents thereof, are intended to define the scope of the invention.

The invention claimed is:

1. A substantially flat or planar fiber preform for use in an overmolding process, the fiber preform comprising:
   a fiber bundle arranged in a predetermined pattern and attached to itself by a plurality of stitches of a thread to form at least one preform layer defining a preform area; and
   at least one positioning element extending beyond the preform area, the at least one positioning element configured to engage with at least one corresponding alignment element on a mold to indicate proper positioning of the at least one fiber preform within the mold to form a three-dimensional article by the overmolding process and containing the at least one fiber preform.

2. The fiber preform of claim 1 wherein the thread is a thermoplastic thread.

3. The fiber preform of claim 1 further comprising a substrate to which the fiber bundle is attached by the plurality of stitches of the thread.

4. The fiber preform of claim 1 wherein the at least one positioning element is at least one additional thread stitched to the at least one preform layer.

5. The fiber preform of claim 4 wherein the at least one additional thread is a visually distinct color.

6. The fiber preform of claim 4 wherein the at least one additional thread extends between at least two opposing edges of the preform.

7. The fiber preform of claim 1 wherein the at least one positioning element is an embroidered design stitched to the at least one the preform layer.

8. The fiber preform of claim 7 wherein the embroidered design is a visually distinct color.

9. The fiber preform of claim 8 wherein the embroidered design touches at least three points along a plurality of edges of the at least one preform layer.

10. The fiber preform of claim 8 wherein the embroidered design spells a word.

11. The fiber preform of claim 1 wherein the at least one positioning element is a plurality of holes formed in the at least one preform layer.

12. The fiber preform of claim 1 wherein the at least one positioning element is a plurality of loops extending from the at least one preform layer.

13. The fiber preform of claim 12 wherein the plurality of loops extend from a plurality of edges of the at least one preform layer.

14. The fiber preform of claim 1 wherein the at least one positioning element is a plurality of magnetic elements attached to the at least one preform layer.

15. The fiber preform of claim 1 wherein the at least one positioning element is an RFID tag attached to the at least one preform layer.

16. The fiber preform of claim 1 wherein the at least one positioning element is a design painted onto a surface of the at least one preform layer.

17. The fiber preform of claim 1 wherein at least one of the more than one preform layer includes at least one area that is void of the fiber bundle in a location where the at least one preform layer is configured to bend.

18. The fiber preform of claim 1 wherein the at least one preform layer includes at least one slit in a location where the at least one preform layer is configured to bend.

19. A method for using a fiber preform of claim 1, the method comprising:
   engaging the at least one positioning element of the fiber preform with the at least one corresponding alignment element on the mold to indicate proper positioning of the fiber preform within the mold; and overmolding the fiber preform with a resin.

20. The method of claim 19 further comprising urging the fiber preform to conform to the three-dimensional shape of the shaping mold after engaging the at least one positioning element of the fiber preform with the at least one corresponding alignment element on the mold.

\* \* \* \* \*